(12) United States Patent
Dutra et al.

(10) Patent No.: US 12,203,150 B2
(45) Date of Patent: Jan. 21, 2025

(54) PROCESS FOR THE PRODUCTION OF IRON ORE FINES AGGLOMERATE AND THE AGGLOMERATED PRODUCT

(71) Applicant: VALE S.A., Rio de Janeiro (BR)

(72) Inventors: Flávio de Castro Dutra, Ouro Branco (BR); Valdirene Gonzaga De Resende, Belo Horizonte (BR); Fabrício Vilela Parreira, Belo Horizonte (BR)

(73) Assignee: VALE S.A., Rio de Janeiro (BR)

( * ) Notice: Subject to any disclaimer, the term of this patent is extended or adjusted under 35 U.S.C. 154(b) by 369 days.

(21) Appl. No.: 17/419,170

(22) PCT Filed: Nov. 8, 2019

(86) PCT No.: PCT/BR2019/050485
§ 371 (c)(1),
(2) Date: Jun. 28, 2021

(87) PCT Pub. No.: WO2021/087582
PCT Pub. Date: May 14, 2021

(65) Prior Publication Data
US 2022/0106664 A1  Apr. 7, 2022

(30) Foreign Application Priority Data
Nov. 5, 2019 (BR) .................. 1020190231955

(51) Int. Cl.
*C22B 1/243* (2006.01)
*B22F 1/12* (2022.01)
*C21B 13/00* (2006.01)

(52) U.S. Cl.
CPC .......... *C22B 1/243* (2013.01); *B22F 1/12* (2022.01); *C21B 13/0046* (2013.01)

(58) Field of Classification Search
None
See application file for complete search history.

(56) References Cited

U.S. PATENT DOCUMENTS 8,999,032 B2   4/2015 Dutra et al.
2011/0232420 A1  9/2011 Porto Pimenta et al.
(Continued)

FOREIGN PATENT DOCUMENTS

BR  112012011771 A2   3/2018
BR  112014005488 B1   3/2019
(Continued)

OTHER PUBLICATIONS

English translation of BR 102019009592 (originally published Jul. 23, 2019), obtained from PE2E search.*
(Continued)

*Primary Examiner* — George Wyszomierski
(74) *Attorney, Agent, or Firm* — ArentFox Schiff LLP

(57) ABSTRACT

The present invention relates to a process for the production of iron ore fines agglomerate, resistant to handling, transport, and contact with water. The process consists of mixing iron ore fines with sodium silicate, nanomaterials, catalyst, fluxes and plasticizer; adjusting the moisture of the mixture; agglomerating the mixture by pelletizing, briquetting or extrusion; performing curing at room temperature. The process does not require energy input for heat treatment and allows obtaining an agglomerated product with high physical and metallurgical performance to replace metallic load, including sinter, in reduction furnaces, without the emission of harmful gases such as $CO_2$, dioxins, furans, and $SO_x$.

13 Claims, 2 Drawing Sheets

(56) References Cited

U.S. PATENT DOCUMENTS

2013/0243973 A1* 9/2013 Dutra ................. C22B 1/243
                                                    427/560
2018/0320246 A1* 11/2018 Al-Tassan ............ C22B 1/2406
2021/0395846 A1* 12/2021 Perrin ................. C21C 1/025

FOREIGN PATENT DOCUMENTS

| BR | 102019009592 A2 * | 7/2019 |
| WO | WO-03/095682 A1 * | 11/2003 |
| WO | 2007080356 A1 | 7/2007 |
| WO | 2019034859 A1 | 2/2019 |

OTHER PUBLICATIONS

International Search Report and Written Opinion issued in International Patent Application No. PCT/BR2019/050485 on Jan. 23, 2020.
Flavio de Castro Dutra, Valdirene Gonzagade Resende, Anderson Dias. "Use of Carbon-based Nanomaterials on the Cold Agglomeration of Iron Ore Fines". ISIJ International, 2019, v. 59, n. 4. p. 660-664. DOI: 10.2355/isijinternational.SIJINT-2018-289, Apr. 17, 2019.

\* cited by examiner

PROCESS FOR THE PRODUCTION OF IRON ORE FINES AGGLOMERATE AND THE AGGLOMERATED PRODUCT

This application is a 35 U.S.C. § 371 National Phase of PCT Application No. PCT/BR2019/050485, filed Nov. 8, 2019, which claims priority to Brazilian application Ser. No. 1020190231955, filed Nov. 5, 2019, the disclosures of which are hereby incorporated by reference herein in their entireties.

FIELD OF INVENTION

The present invention belongs to the field of mineral-metallurgical technologies and refers to a process for the production of iron ore fines agglomerate, resistant to handling, transport and contact with water. The process does not require energy input for heat treatment and allows obtaining a high-performance agglomerated product for replacement of metallic load, including sinter, in reduction furnaces, without the emission of harmful gases such as $CO_2$, dioxins, furans, and $SO_x$.

BACKGROUND OF THE INVENTION

The development of agglomeration technologies stemmed from the need to recover fine particles, providing commercial use of these particles, as well as minimizing environmental impact caused by the production of fine or particulate material.

Most usual applications of agglomeration processes are concerned for the use of:
- fine-grained ores or concentrates, without causing damage to the load permeability and to the gas-solid reaction conditions in metallurgical furnaces;
- wastes, or fine by-products of other mining-metallurgical processes, for reuse or recycling thereof, in an appropriate manner; and
- metallic waste (copper, iron, titanium) and other materials (paper, cotton, wood) for transportation or recycling.

The iron ore agglomeration operations are designed to give the loads to be fed into the reduction furnaces an adequate shape and proper mechanical resistance to the descending path of that load in the blast furnace, with percolation of gases through the load. The most common agglomeration processes for iron ores used as load in steelmaking reduction furnaces are sintering, pelletizing, and briquetting.

Iron ore sintering converts ore fines, usually with particle size distributions between 0.15 mm and 6.3 mm, called sinter feed, into larger agglomerates, called sinter. Its granulometric range is between 5 mm and 25 mm of particle size, presenting physical, metallurgical, and permeability characteristics satisfactory for efficient blast furnace operation. Sintering is a process based on the incipient fusion of the components of a mixture consisting of a main component and additions of fluxes, promoting the rigid bonding of the particles, with the solidification of the liquid phase. Iron ore sintering is carried out in three stages: preparation of raw materials, ignition, and burning at levels of 1300° C., in addition to cooling.

The sintering process is usually a large-scale process that requires considerable investment in CAPEx.

Since sinter has a relatively high handling degradation rate, it is not suitable for transportation over long distances, especially on ships. This is one of the reasons why sintering is installed near customers' blast furnaces.

Pelletizing is the most recent agglomeration process and it was a result of the need to use fine concentrates of magnetite from certain iron ores. Iron ore pellets are produced by agglomeration of particles of less than 45 μm in size, forming pellets of from 8 to 16 mm, in disc or rotating drum. The material to be agglomerated must have a high specific surface (2,000 $cm^2/g$), in addition to constant moisture. These pellets are usually hardened by means of heat treatment and used as feed in blast furnaces or in direct reduction. This hardening process has a high cost of capital, in addition to being intensive in expenditure of energy.

Briquetting consists on the agglomeration of fine particles by means of compression, aided by binders, allowing the obtainment of a compacted product with adequate shape, size, and mechanical parameters. The mixture between fine particles and agglomerate is pressed in order to obtain agglomerates called briquettes, which must have adequate resistance for stacking, further treatment (curing, drying, or burning), transport, handling, and use in metallurgical reactors. Reducing the volume of the material, in addition to the technological benefits, allows fine materials to be more economically transported and stored.

The concern with environmental matters, resulting in stricter laws, in addition to the need to economically profit the wastes and fine particles generated in the processing of ores, made briquetting an important alternative to agglomerate fine materials giving them economic value.

Briquetting is carried out with binders when the material to be agglomerated does not have compressive and impact resistance, after being compacted. The applied pressures are usually low to avoid further fragmentation of the particles. When briquettes are made without binders, however, the success of the process depends on the grinding or on plastic deformation of the particles to bring them as close as possible. The forces, in these cases, responsible for the cohesion of the particles after compaction should only ensure that the distance between the crystals becomes as small as possible. It is common to use lubricants, such as water, graphite, and other materials to reduce friction in the operation.

When the binding substance is in liquid form, the addition of water to the briquetting process is not required. The mixture of fine particles and the binder is then cold or hot pressed, thereby obtaining the briquettes. The use of binders in the briquetting process implies the need for a briquette curing process. The curing of briquettes consists of reactions that occur between the particles and the binder, which will confer to the agglomerate the desired mechanical resistance. This step can be carried out at room temperature, in greenhouses and dryers (400° C.), or in furnaces (above 1,000° C.).

Cold-cured agglomerates, that is, those that cure at room temperature, have a lower cost when compared to conventional curing processes where the agglomerates require thermal input to have a resistance gain.

The prior art features several cold ore agglomeration technologies. These technologies are mainly based on the agglomeration of fine ore particles using binding agents such as cement, mortar, organic binders, and carbonaceous residues.

The physical resistance of agglomerated ore products is one of the main quality requirements for application in metallurgical reactors and has a direct impact on productivity and process costs. The nanomaterials technology provides possibilities for the agglomeration of ore fines. Nanomaterials work as a composite network that confers to the agglomerated products, among other characteristics, high mechanical strength.

The North American U.S. Pat. No. 8,999,032, on behalf of Vale S. A., for example, describes the application of carbon nanotubes in iron ore, nickel, and manganese agglomerates in order to increase their mechanical strength. The invention also relates to a process for preparing ore agglomerates that comprises the dispersion of carbon nanotubes in a matrix to form a mixture, its pelletizing, briquetting, or extrusion, and the drying of the agglomerate at 150 to 200° C.

The invention presented by the present patent application differs from what is disclosed in the previous document, since it does not require the drying step and due to the raw materials used in the agglomerate production. The previous document does not use catalysts and fluxes.

The prior art also includes other publications related to the process for the production of ore fines agglomerates, as exemplified below.

The first patent related to briquetting was granted to William Easby, in 1848, for coal fines in the United States. The developed process allowed the formation of solid agglomerates of varying sizes and shapes, from fine fractions of any type of coal due to the pressure exerted on this material. The process steps initially involved drying the coal, followed by crushing and sieving. Subsequently, the fines are mixed with 6% cast asphalt, and the mixture is briquetted on roller machines producing solid agglomerates.

The U.S. Pat. No. 9,175,364, also on behalf of Vale S. A., discloses a method of producing agglomerates from the mixture of ore fines, with a granulometry of less than 0.150 mm, with sodium silicate, cassava starch, and micro silica. Water is added into the agglomeration process, which can take place in a disc, pelletizing drum, or in a fluidized bed furnace. The agglomerates are subjected to the drying process at a temperature of from 100 to 150° C.

The present invention differs from what is disclosed in the previous document, since it does not require the drying step and due to the raw materials used in the production of the agglomerate. The previous document has a restriction for using only ore fines with a granulometry of less than 0.150 mm and for not using catalysts and fluxes.

Patent application BR 10 2019 009592 0, on behalf of Vale S. A. and Universidade Federal de Ouro Preto, refers to the reuse of iron mining tailings for the production of briquettes by compaction using mixtures of these tailings with iron ore fines and liquid sodium silicate, as a binder. The briquettes are subjected to curing at a temperature of from 250 to 550° C. for a period of 20 to 40 minutes.

The present invention differs from what is disclosed in the previous document, since it does not require the drying step and due to the raw materials used in the production of the agglomerate.

The U.S. Pat. No. 6,921,427, filed in 2002 on behalf of the Council of Scientific & Industrial Research, refers to a process of cold briquetting and pelletizing of ferrous or non-ferrous ores fines, using an iron-containing mineral binder, for metallurgical applications.

The process consists of the steps of mixing about 80 to 95% of the fine material with 3 to 10% of an iron-containing mineral binder and, optionally, with 2 to 6% of water and from 0.05 to 0.20% of a surface activate agent (triethanolamine) can be added to form a homogenized dry mixture. Subsequently, the mixture is agglomerated to form a compacted mass that is then subjected to a curing stage for 3 to 20 days by exposure to atmospheric air for 10 to 14 hours. During curing, the produced agglomerates exposed to atmospheric air are sprayed with water every 12 hours to develop cold strength.

In this patent, it is described that the binder agent has an important role in the development of cold strength by hydration in the agglomerated product. The chemical composition of the binder is 25-45% by weight of FeO, 40-60% of $Cao_2+MgO$ and 12-18% of $SiO_2+Al$—O.

The tests were carried out producing agglomerates in the form of briquettes, blocks, and pellets, by using different combinations of iron oxides, metals, and other mineral fines such as powders and slurries of blast furnaces, of oxygen-inflated furnaces (BOF), rolling scale, fines and slurries contaminated with oil and coal, lime, limestone, dolomite, dunite, quartzite, coke and carbonaceous materials using iron bearing hydraulic mineral binder.

The process presented in U.S. Pat. No. 6,921,427 differs from the present invention regarding the binders and other inputs used. While the presented document reports the use of a mineral binder containing iron and triethanolamine, which is an organic compound, the present patent application proposes the use of sodium silicate as a binder agent. Moreover, U.S. Pat. No. 6,921,427 makes use of carbonaceous materials and has a significantly different curing step.

Mohanty, M. K. et al (2016), in their publication entitled "A *novel technique for making cold briquettes for charging in blast furnace*" describes the production of extruded agglomerates in which the concept of cold agglomeration is presented. Iron ore fines and carbonaceous materials (such as coke fines and blast furnace powders) are mixed with Portland cement, which is used as a binder, and also with a clay mineral, acting as a rheological modifier. The mixture is subjected to a rigid extrusion process at high pressure (100 $kg/cm^2$) and under vacuum ($0.5 \times 10^{-3}$ Bar) and does not require heat treatment of the resulting extruded agglomerates. The characteristics of the produced agglomerates and the assessments of their metallurgical behavior (reducibility) are presented, comparing them with iron ore.

The present invention differs from what is disclosed in the previous document due to the raw materials used in the production of the agglomerate. The present invention does not use carbonaceous materials and does not apply Portland cement as a binder.

The present invention is related to a process for the production of iron ore fines agglomerates of high physical and metallurgical performance for replacement of metallic load, including sinter, in reduction furnaces. The agglomerates are produced from the mixture of iron ore fines (sinter feed, pellet feed, and ultrafine tailing), with a particle size distribution of less than 10 mm, with a binder (sodium silicate) and additives such as nanomaterials, catalysts, fluxes, and plasticizers. The agglomeration process can occur by pelletizing in disc or in a drum, by briquetting, or by extrusion. Agglomerates are subjected to curing at room temperature for 2 days in a covered place until they reach sufficient water resistance to be exposed to weather and transport. Complete curing occurs in up to 10 days.

The present invention has advantages in comparison to the processes for agglomeration of iron ores known from the prior art, such as: (i) curing at room temperature—it does not require energy input for heat treatment and there are no emissions of harmful gasses such as $CO_2$, dioxins, furans, and $SO_x$, (ii) possibility of use of iron mining tailings, (iii) no use of coal or other carbonaceous material, (iv) obtaining agglomerate with high physical performance, resistant to handling and transport over long distances, in addition to being water-resistant in less time, optimizing the logistics of production flow.

Objectives of the Invention

The present invention has as main objective providing a new process for the production of iron ore fines agglomerate intended for the replacement of metallic load in reduction furnaces (granules, pellets, sinter) with excellent physical and metallurgical performance.

Another objective of the present invention consists in obtaining an agglomerated product with high physical resistance to handling and transportation over long distances, in addition to being water-resistant in less time, which optimizes the production flow logistics.

Another objective of the present invention is to reduce the generated environmental impact since fossil fuels are not used in the agglomerate constitution. In addition, the curing performed at room temperature does without energy input and renders the production process free of atmospheric emissions (particulates, $SO_x$, dioxins, furans, $CO_2$) and other volatile compounds.

SUMMARY OF THE INVENTION

The present invention, in its preferred embodiment, discloses a process for the production of iron ore fines agglomerate for replacement of metallic load in reduction furnaces comprising the following steps:
a) mixing a nanomaterial and a catalyst to sodium silicate for preparing the binder mixture;
b) mixing 1-5% of the binder mixture from step a) with 70-100% iron ore fines, 0-30% fines of fluxes and 0-5% plasticizer in intensive mixer;
c) adjusting the moisture in such a way to obtain the amount of 0-30% of water weight in the mixture;
d) performing agglomeration by pelletizing, briquetting or extrusion;
e) keeping the agglomerates at room temperature for 2-10 days for curing;
wherein the following dosages are used:
0.05 to 2% by weight of nanomaterial relative to sodium silicate;
0.05 to 5% by weight of catalyst relative to sodium silicate.

BRIEF DESCRIPTION OF DRAWINGS

The present invention is described in detail based on the respective figures.

DETAILED DESCRIPTION OF THE INVENTION

Although the present invention may be susceptible to different embodiments, the preferred embodiments are shown in the Figures and in the following detailed discussion, with an understanding that the present description must be considered as an exemplification of the principles of the invention, and they are not intended to limit the present invention to what was hereby illustrated and described.

The subject matter of the present invention will be detailed hereafter by the way of example and not limitative, since the materials and methods hereby disclosed may comprise different details and procedures without escaping from the scope of the invention. Unless otherwise stated, all parts and percentages shown below are weight percentages.

The main approach of this invention is related to a process for the production of iron ore fines agglomerate comprising the following steps:
a) mixing a nanomaterial and a catalyst to sodium silicate for preparing the binder mixture;
b) mixing 1-5% of the binder mixture from step a) with 70-100% iron ore fines, 0-30% fines of fluxes and 0-5% plasticizer in intensive mixer;
c) adjusting the moisture in such a way to obtain the amount of 0-30% of water weight in the mixture;
d) performing the agglomeration by pelletizing, briquetting or extrusion;
e) keeping the agglomerates at room temperature for 2-10 days for curing;
wherein the following dosages are used:
0.05 to 2% by weight of nanomaterial relative to sodium silicate;
0.05 to 5% by weight of catalyst relative to sodium silicate.

Figure 1:
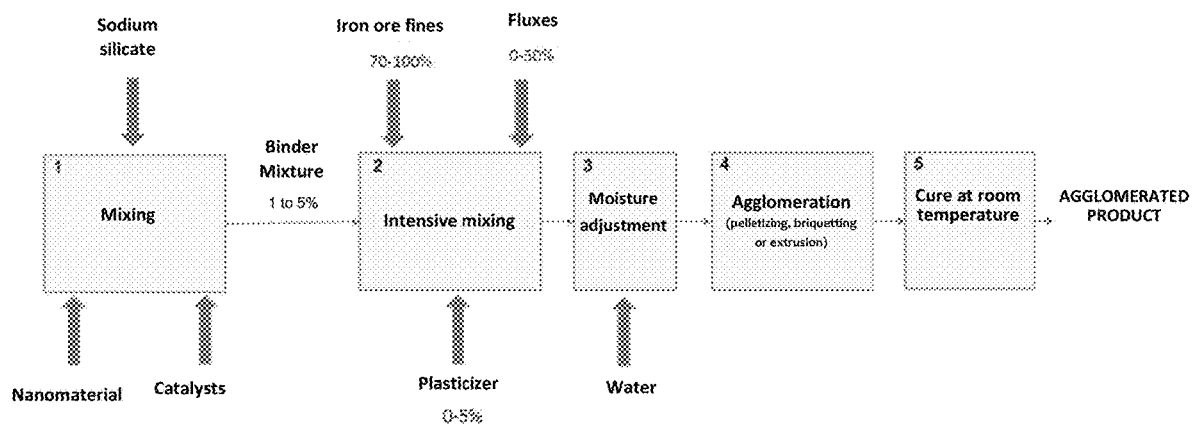
FIG. 1 illustrates a simplified block diagram of the process for the production of agglomerates from iron ore fines.

The process for the production of agglomerate, represented by the block diagram of FIG. 1, preferably begins with the mixing and dispersion of the additives in sodium silicate, which is the binder agent applied in the process.

The sodium silicate used in the process has preferably the $SiO_2/Na_2O$ molar ratio of from 1.8 to 4.5, 36 to 48% of solids, and the following composition: 5-14.6% of $Na_2O$; 22-33.2% of $SiO_2$; 54.0-73.0% of $H_2O$.

As an additive to sodium silicate, there is the addition of nanomaterial under mechanical stirring, at a dosage of 0.05 to 2% by weight relative to the amount of sodium silicate used in the mixture. The nanomaterial is selected from the group consisting of: carbon nanotube, exfoliated graphite, functionalized microsilicate, tubular nano silica, tubular halloysite, carbon nanofiber, and graphene.

As a catalyst to accelerate the curing process at room temperature, sodium pyrophosphate, magnesium hydroxide, propylene carbonate, glycerin carbonate, calcium hydroxide, calcium oxide, glycerol triacetate, aluminum chloride, aluminum hydroxide, triacetin, diacetin, and metallic aluminum can be used. Under mechanical stirring, 0.05 to 5% by weight of catalyst relative to the amount of sodium silicate used in the mixture are added.

The second step of the process for the production of agglomerate consists on adding 1 to 5% of the agglomerating mixture (formed by sodium silicate, nanomaterial, and catalyst), to from 70 to 100% by weight of iron ore fines, 0 to 30% by weight of fluxes and 0 to 5% by weight of plasticizer. Mixing should preferably be carried out in an intensive mixer for 10-180 seconds.

The iron ore fines to be used in the process must have a particle size distribution of less than 10 mm, $d_{90}$ between 1 and 8 mm, and maximum moisture of 25%. Sinter feed, pellet feed, and ultrafine iron ore tailing can be used, which, in the prior art, is disposed of in tailings dams. The preferred chemical composition of ore fines consists of 30 to 68% $Fe_{Total}$, 0.5 to 15% $SiO_2$, 0.1 to 5.0% $Al_2O_3$, 0.001 to 0.1% P, 0.1 to 2% Mn and 0.1 to 8% PPC (loss on ignition).

The fluxes used in the process for the production of agglomerates are selected from the group consisting of calcium hydroxide, calcitic limestone, dolomitic limestone, calcined magnesite, serpentinite, talc, dunite, and olivine.

The plasticizing agent used in the process for the production of agglomerate is selected from the group consisting of bentonite, corn starch, cassava starch, glycerin, and CMC (carboxymethyl cellulose).

The third step of the process for the production of agglomerate is to adjust the moisture by adding water in such a way that the mixture has optimal moisture (0 to 30%) for the subsequent agglomeration process.

The fourth step of the process for the production of agglomerate consists of carrying out agglomeration by pelletizing, briquetting, or extrusion.

If the agglomeration method by briquetting is chosen, the mixture should preferably contain moisture in the range of 2-10%. The briquetting can be carried out by means of press with rollers containing cavities appropriate for obtaining briquettes with the dimensions of 20-40 mm×10-30 mm×5-20 mm, and with the necessary pressure adjustment to obtain briquettes with bulk density between 2.5 to 3.5 g/cm$^3$. Bulk density control is necessary to obtain briquettes with adequate porosity.

If the agglomeration method by pelletizing is chosen, the mixture should preferably contain moisture in the range of 8-11%. The pelletizing process can be carried out in a rotary disc or drum, forming spherical pellets with 10-30 mm in diameter.

If the agglomeration method by extrusion is chosen, the mixture should preferably contain moisture in the range of 10-30%. The extrusion process can be carried out on extruders which, preferably, allow the formation of cylindrical agglomerates of 530 mm in diameter and 5-30 mm in height.

The fifth step of the process for the production of agglomerate consists in curing at room temperature.

Figure 2:
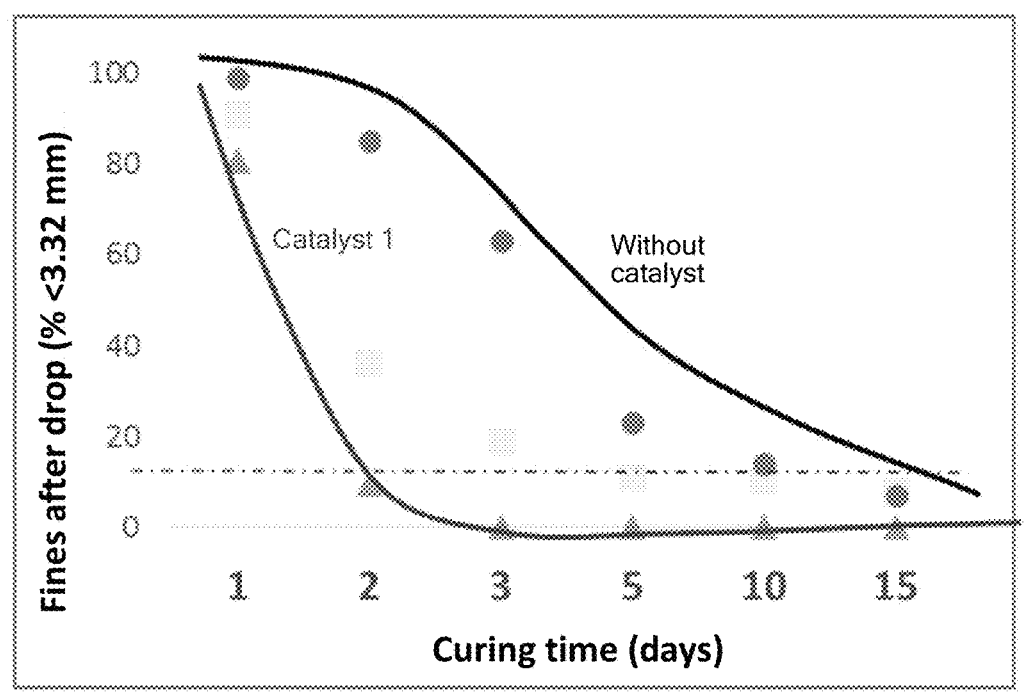
FIG. 2 illustrates a graph showing the reduction of curing time at room temperature as a function of the use of catalyst.

The use of catalysts to promote the hardening of sodium silicate is efficient in reducing the curing time from 15 days to 2 days, thereby allowing the transport and handling of the product in rainy conditions (bad weather). The catalyst promotes the formation of insoluble compounds and polymerization of sodium silicate, making the product more resistant to water in a shorter cure time, as shown in FIG. 2.

Complete curing at room temperature, which occurs from 2 to 10 days, allows the final moisture of the agglomerates to be less than 3%.

Optionally, if it is necessary that the agglomerates get resistance in the shortest possible time, it can be chosen to perform the drying in horizontal furnace for 10 to 30 minutes at a temperature of from 100 to 550° C. However, this option is not recommended because it is not considered an environmentally sustainable alternative.

The iron ore agglomerate obtained by means of the present invention is presented as an alternative to replace metallic load in reduction furnaces since it presents adequate chemical, physical and metallurgical quality, such as presented in Table 1, Table 2 and Table 3 as follows.

TABLE 1

Chemical quality of the agglomerates obtained by means of the process of the present invention Briquettes FeT (30-68%); SiO$_2$ (0.5-15%); Al$_2$O$_3$ (0.1-5%); P (0.001 to 0.1%); Mn (0.1-2%); CaO (0-15%), MgO (0-5%); PPC (0.1 to 8%).

TABLE 1-continued

Chemical quality of the agglomerates obtained by means of the process of the present invention Pellets FeT (30-68%); SiO$_2$ (0.5-15%); Al$_2$O$_3$ (0.1-5%); P (0.001 to 0.1%); Mn (0.1-2%); CaO (0-15%), MgO (0-5%); PPC (0.1 to 8%).

Extruded

FeT (30-68%); SiO$_2$ (0.5-15%); Al$_2$O$_3$ (0.1-5%); P (0.001 to 0.1%); Mn (0.1-2%); CaO (0-15%), MgO (0-5%); PPC (0.1 to 8%).

TABLE 2

Metallurgical quality of the agglomerates obtained by means of the process of the present invention Briquettes ISO 7215 reducibility: >60%
ISO 4696-2 RDI: % −2.8 mm: <25%
ISO 4698 swelling: <25%

Pellets

ISO 7215 reducibility: >60%
ISO 4696-2 RDI: % −2.8 mm: <25%
ISO 4698 swelling: <25%

Extruded

ISO 7215 reducibility: >60%
ISO 4696-2 RDI: % −2.8 mm: <25%
ISO 4698 swelling: <25%

TABLE 3

Physical quality of the agglomerates obtained by means of the process of the present invention Briquettes JIS M8711 ShatterTest: % +10 mm: >90%
ISO 3271 Tumbler Test: % +6.3 mm: >85%
ISO 3271 Abrasion: % −0.5 mm: <10%
ISO 8371 Crackling: % −6.3 mm: <5%
Shatter Test JIS M8711 *Weathering: % +10 mm: >80%
Dry compressive strength: daN/briquette >200

Pellets

JIS M8711 Shatter Test: % +10 mm: >90%
ISO 3271 Tumbler Test: % +6.3 mm: >85%
ISO 3271 Abrasion: % −0.5 mm: <15%
ISO 8371 Crackling: % −6.3 mm: <5%
JIS M8711 Shatter Test *Weathering: % +10 mm: >80%
Dry compressive strength: daN/briquette >150

Extruded

JIS M8711 Shatter Test: % +10 mm: >90%
ISO 3271 Tumbler Test: % +6.3 mm: >85%
ISO 3271 Abrasion: % −0.5 mm: <15%
ISO 8371 Crackling: % −6.3 mm: <5%
Shatter Test JIS M8711 *Weathering: % +10 mm: >80%

*weathering: immersion into water for 1 hour.

Example

In order to evaluate the quality, characteristics, and performance of the agglomerates produced by means of the process described by the present invention, pilot scale tests were performed for the production of briquettes, using the sinter feed as iron ore fines.

Figure 3:
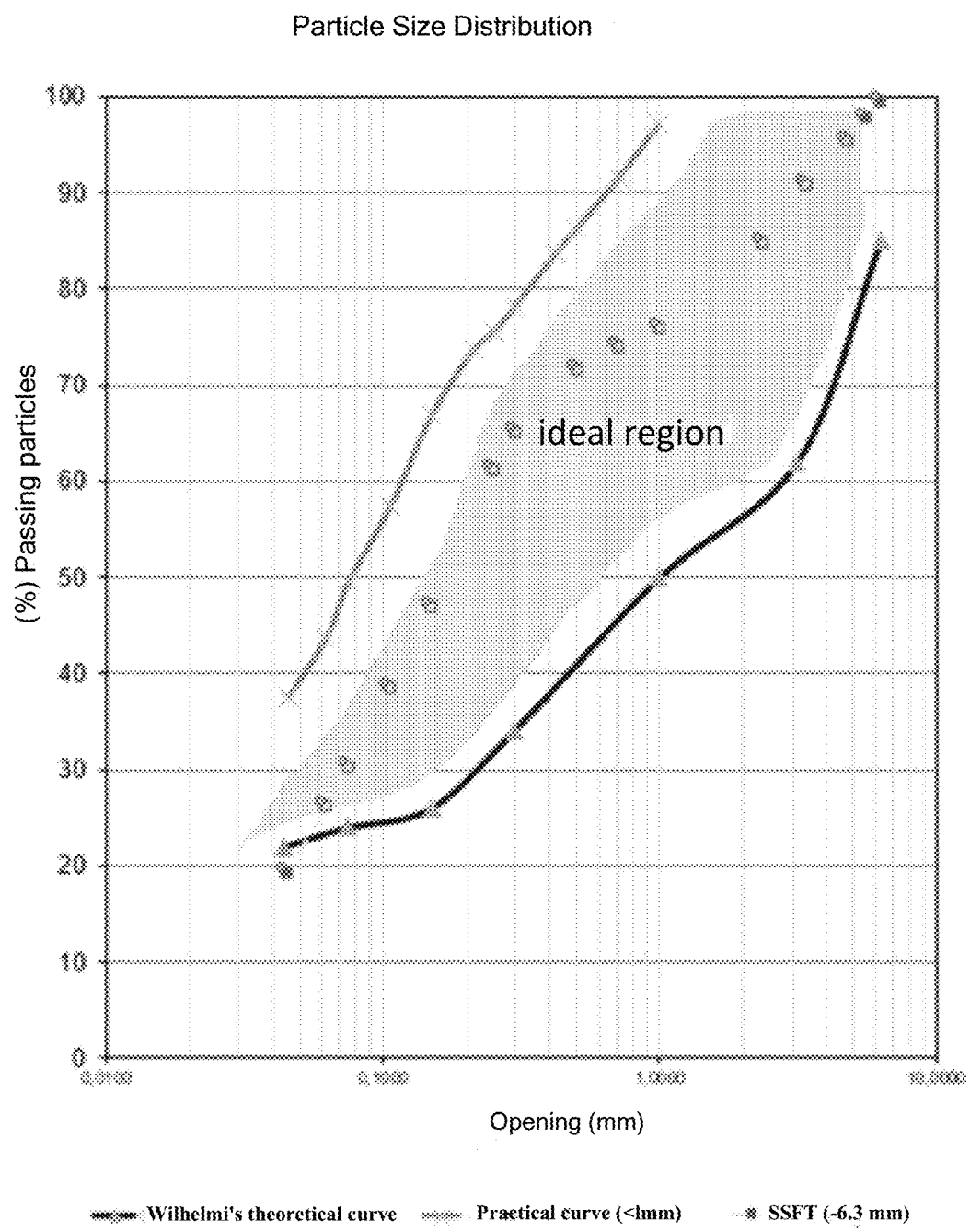
FIG. 3 shows the granulometric distribution of the sinter feed sample used in the pilot test.

The sinter feed used had moisture of less than 8% and d$_{90}$ between 2 to 8 mm. The particle size distribution curve is shown in FIG. 3, wherein the sample used was found to be in the granulometric range evidenced by the hatched area. The tests were carried out in batches of 100 kg of sinter feed each.

The sodium silicate solution used presented a $SiO_2/Na_2O$ molar ratio of 2.15, solids percentage of 47%, being composed by 14.6% $Na_2O$, 31.4% $SiO_2$, and 54% $H_2O$. The solution presented true density of 1.57 g/cm$^3$ and viscosity of 1175 cP at 25° C. Functionalized microsilicate was added at a dosage of 0.1% relative to the amount of sodium silicate used in the mixture. The calcium hydroxide catalyst was added at a dosage of 2.5%. Mechanical mixing was performed for 5 minutes to obtain the final binder mixture.

3% of said binder mixture was added to 71.7% of sinter feed, 25% of fines of fluxes (calcitic limestone and serpentinite) and 0.3% of bentonite. Mixing was carried out in the Eirich intensive mixer for 120 seconds.

Briquettes were produced using a Komarek briquetting press, at 200 Bar, which allowed the formation of "pillow" type morphology briquettes, with dimensions of 25×20×15 mm and moisture <0.5%. Curing was carried out at room temperature for 5 days.

The quality of the briquettes was evaluated concerning physical, chemical, and metallurgical properties, according to procedures specified in standards for the evaluation of iron ores.

The compression strength was evaluated using dry briquettes in an automatic press with a ±5 daN sensitivity, to evaluate the compressive load that causes its breakdown. The same test was performed with briquettes after immersion in water for a period of 1 hour. The average result obtained for dry briquettes was >120 daN/briquettes in the largest area (25×20 mm), and for briquettes, after immersion, there was a 30% resistance drop.

The test for abrasion resistance and tumble indices was performed using 1.5 kg of dry briquettes subjected to 464 revolutions in a drum. At the end of the test, the mass was sifted in sieves with openings of 6.3 mm and 0.5 mm. The tumble indices (ISO 3271), which consists of the percentage of mass retained at 6.3 mm, was >85%. The abrasion indices (ISO 3271), which consists of the percentage of passing mass in 0.5 mm, was <15%.

The shatter strength test was performed with a 3 kg sample of dry briquettes subjected to four successive drops of three meters. At the end of the last drop, the mass was sifted using a sieve with a 10 mm opening. The Shatter Strength Index (Shatter—JIS M8711), which consists of the mass percentage greater than 10 mm, was >95%.

For determining the decrepitation index (DI), the test mass was rapidly heated from room temperature up to 700° C., maintained at this temperature and then air cooled until reaching room temperature. Sieving was carried out with a sieve containing 6.3 mm square openings. The Decrepitation Index, which consists of the mass percentage of the material with a size greater than 6.3 mm, was <5%.

The reducibility index (RI) of the briquettes has been evaluated according to ISO 7215, under conditions similar to the conditions that prevail in the blast furnace reduction zone. The average result obtained was >60%.

The low-temperature reduction-degradation test (RDI) was performed in accordance with ISO 4696-2, after reduction with CO and N gases under conditions similar to the low-temperature reduction-zone of the blast furnace. The average result was <15%.

Table 4 presents a comparison between the physical quality of the briquette produced by the process of the present invention in relation to other products such as sinter (obtained by means of the traditional sintering process), pellet (obtained by means of the traditional pelletizing process), and the commercial granules from Brazil and Australia. It is possible to prove that the briquette produced by means of the process of the present invention has high physical and metallurgical performance and, for this reason, it is considered as an alternative for substituting the metallic load of reduction furnaces with less environmental impact.

Note that, in Table 4, the "RDI" acronym refers to the degradation test under low-temperature reduction, "S" corresponds to the permeability index, "ΔPmax" corresponds to the maximum gas pressure drop, "$T_{S200}$" corresponds to the dripping start temperature, "Td" corresponds to the softening end temperature, and "ΔT" refers to the temperature gradient corresponding to the softening and melting zone (Td–$T_{S200}$).

TABLE 4

Comparison of the briquette quality parameters obtained by means of the process of the present invention

| | Tumble % > 6.3 mm | Abrasion % < 0.5 mm | Decrepitation % > 4.75 mm | RDI %-2.8 mm | Reducibility % | S kg*C/cm$^2$ | ΔP max mmH$_2$0 | TS$_{200}$ ° C. | ΔT ° C. | Td ° C. | Fines of adherents % |
|---|---|---|---|---|---|---|---|---|---|---|---|
| Vale BRIQUETTE | 85 | 10 | 0.1 | 15 | 60 | 30 | 3000 | 1150 | 200 | 1350 | 0.5 |
| Vale Sinter | 65 | NA | NA | 25 | 65 | 30 | 3000 | 1150 | 200 | 1350 | NA |
| Vale Pellet | 90 | 6 | 0 | 5 | 60 | 100 | 5000 | 1100 | 300 | 1400 | NA |
| Vale Granulate 1 | 75 | 18 | 3 | 26 | 66 | 45 | 3247 | 1087 | 312 | 1427 | 2.8 |
| Vale Granulated 2 | 79 | 15 | 2 | 15 | 58 | 41 | 3440 | 1104 | 250 | 1392 | 3 |
| Vale Granulated 3 | 81 | 15 | 0.5 | 32 | 64 | 30 | 2363 | 1156 | 296 | 1457 | 2.02 |
| Vale Granulated Average | 78 | 16 | 2 | 24 | 63 | 38 | 3017 | 1116 | 286 | 1425 | 3 |
| AUS Granulated 1 | 85 | 10 | 6 | 26 | 56 | 56 | 4897 | 1111 | 282 | 1406 | 3.89 |
| AUS Granulated 2 | 85 | 8 | 3 | 19 | 70 | 44 | 4897 | 1128 | 269 | 1429 | 0.96 |
| AUS Granulated 3 | 85 | 9 | 4 | 23 | 60 | 34 | 3676 | 1146 | 228 | 1418 | 2 |
| AUS Granulated Average | 85 | 9 | 4 | 23 | 62 | 45 | 4490 | 1128 | 260 | 1418 | 2 |

Thus, although only some embodiments of the present invention have been shown, it will be understood that various omissions, substitutions, and changes can be made by a skilled person, without departing from the spirit and scope of the present invention. The described embodiments should be considered in all aspects only as illustrative and not restrictive.

It is expressly provided that all combinations of the elements that perform the same function substantially in the same manner to achieve the same results are within the scope of the invention. Substitutions of elements from one described embodiment to another are also fully intended and contemplated.

The invention claimed is:

1. A process for producing iron ore fines agglomerates for metallic load replacement in reduction furnaces comprising:
   a) mixing a nanomaterial, a catalyst and sodium silicate for preparing a binder mixture;
   b) mixing 1-5% of the binder mixture with 70-99% iron ore fines, 0-30% fluxes and 0-5% plasticizer in an intensive mixer to provide a mixture;
   c) adjusting a moisture content of the mixture to 0-30% of water by weight of the mixture;
   d) performing agglomeration by pelletizing, briquetting or extrusion to provide agglomerates;
   e) keeping the agglomerates at room temperature for 2-10 days for curing;
   wherein:
   0.05 to 2% by weight of the nanomaterial relative to the sodium silicate is used;
   1.5 to 3.5% by weight of the catalyst relative to the sodium silicate is used;
   the catalyst consists of calcium hydroxide or sodium pyrophosphate or propylene carbonate;
   the process is free of fossil fuels; and
   the fluxes consist of calcitic limestone or dolomitic limestone or serpentinite or calcium hydroxide.

2. The process according to claim 1, wherein the nanomaterial is selected from the group consisting of carbon nanotube, exfoliated graphite, functionalized micro-silicate, tubular nano-silica, tubular halloysite, carbon nanofiber, and graphene.

3. The process according to claim 1, wherein the sodium silicate has a $SiO_2/Na_2O$ molar ratio from 1.8 to 4.5 and a solids percentage from 36 to 48%.

4. The process according to claim 1, wherein the iron ore fines have a granulometry less than 10 mm, an iron content from 30 to 68%, and are selected from the group consisting of sinter feed, pellet feed, and ultrafine iron ore tailings.

5. The process according to claim 1, wherein the plasticizer is selected from the group consisting of bentonite, corn starch, cassava starch, glycerin, and carboxymethyl cellulose.

6. The process according to claim 1, wherein the mixing in b) is carried out in an intensive mixer for 10 to 180 seconds.

7. The process according to claim 1, wherein the curing of e) is carried out in a covered place in the first 2 days.

8. The process according to claim 1, further comprising drying the agglomerates in a horizontal furnace for 10 to 30 minutes at a temperature of 100 to 550° C.

9. Iron ore fines agglomerate produced by the process according to claim 1, wherein the iron ore fines agglomerates comprise:
   30 to 68% iron,
   0.5 to 15% $SiO_2$,
   0.1 to 5.0% $Al_2O_3$,
   0.001 to 0.1% P,
   0.1 to 2% Mn;
   0 to 15% CaO and
   0.1 to 8% loss on ignition;
   wherein the iron ore fines agglomerates exhibit metallurgical performances of:
   ISO 7215 reducibility of >60%;
   Degradation under Low Temperature Reduction ISO 4696-2 of <25%; and
   ISO 4698 swelling of <25%; and
   wherein the iron ore fines agglomerates exhibit physical performances of:
   JIS M8711 ShatterTest results of >90%;
   Tumbler Test ISO 3271 results of >85%;
   ISO 3271 Abrasion of <15%; and
   ISO 8371 Crackling of <5%.

10. The iron ore fines agglomerates according to claim 9, comprising JIS M8711 ShatterTest results of ≥80% after 1 hour of immersion in water; and a Dry Compression Resistance of >150 daN/briquette.

11. The iron ore fines agglomerates according to claim 9, comprising a pillow briquette shape with dimensions of 20-40 mm×10-30 mm×5×20 mm.

12. The iron ore fines agglomerates according to claim 9, comprising a spherical pellet shape with a diameter of 10-30 mm.

13. The iron ore fines agglomerates according to claim 9, comprising a cylindrical shape with a diameter of 5-30 mm and a height of 5-30 mm.

* * * * *